(12) United States Patent
Herrmann et al.

(10) Patent No.: US 9,806,597 B2
(45) Date of Patent: Oct. 31, 2017

(54) CURRENT CONVERSION DEVICE FOR A SINGLE- OR MULTI-AXIS ARRANGEMENT AND OPERATING METHOD

(71) Applicant: Siemens Aktiengesellschaft, München (DE)

(72) Inventors: Bernd Herrmann, Herzogenaurach (DE); Harald Wiessmann, Kirchheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 421 days.

(21) Appl. No.: 14/566,438

(22) Filed: Dec. 10, 2014

(65) Prior Publication Data

US 2015/0162816 A1    Jun. 11, 2015

(30) Foreign Application Priority Data

Dec. 11, 2013  (DE) .......................... 10 2013 225 603

(51) Int. Cl.

| H02J 1/04 | (2006.01) |
|---|---|
| H02J 3/14 | (2006.01) |
| H02M 1/088 | (2006.01) |
| H02J 3/36 | (2006.01) |
| H02M 5/45 | (2006.01) |

(Continued)

(52) U.S. Cl.
CPC ............... *H02M 1/088* (2013.01); *H02J 3/36* (2013.01); *H02M 5/4505* (2013.01); *H02M 7/53875* (2013.01); *H02P 21/0089* (2013.01); *H02M 2001/008* (2013.01); *H02M 2001/325* (2013.01); *Y10T 307/438* (2015.04)

(58) Field of Classification Search
CPC ........ H02J 3/36; H02M 1/088; H02M 5/4505; H02M 7/53875; H02M 2001/008; H02M 2001/325; H02P 21/0089; Y10T 307/438
USPC ............................................. 307/35
See application file for complete search history.

(56) References Cited

U.S. PATENT DOCUMENTS

| 2003/0057906 A1 | 3/2003 | Kissich et al. | |
| 2013/0293988 A1* | 11/2013 | Li | H02P 29/027 361/30 |
| 2014/0361613 A1* | 12/2014 | Huang | H02J 1/06 307/12 |

FOREIGN PATENT DOCUMENTS

| DE | 199 05 457 A1 | 8/2000 |
| DE | 101 46 523 A1 | 4/2003 |
| DE | 10 2012 101 508 A1 | 8/2013 |

* cited by examiner

*Primary Examiner* — Rexford Barnie
*Assistant Examiner* — Toan Vu
(74) *Attorney, Agent, or Firm* — Henry M. Feiereisen LLC

(57) ABSTRACT

For operating multi-axis drive assemblies more reliably even in a field weakening range, a current conversion device is proposed which includes a voltage-source DC link, a plurality of inverters having each a DC input side connected to the voltage-source DC link and AC output-side terminals for connection to an electric motor, and a control device configured to short-circuit each of the inverters. A measurement device measures an electrical variable at each of the inverters. The control device determines based on the measured electrical variables independently for each of the inverters directly or indirectly whether a particular inverter is feeding energy into the voltage-source DC link, and short-circuits, (Continued)

when this is the case, the particular inverter independently of the other inverters. A corresponding operating method is also disclosed.

7 Claims, 1 Drawing Sheet

(51) Int. Cl.
*H02M 7/5387* (2007.01)
*H02P 21/00* (2016.01)
*H02M 1/00* (2006.01)
*H02M 1/32* (2007.01)

CURRENT CONVERSION DEVICE FOR A SINGLE- OR MULTI-AXIS ARRANGEMENT AND OPERATING METHOD

CROSS-REFERENCES TO RELATED APPLICATIONS

This application claims the priority of German Patent Application, Serial No. 10 2013 225 603.5, filed Dec. 11, 2013, pursuant to 35 U.S.C. 119(a)-(d), the content of which is incorporated herein by reference in its entirety as if fully set forth herein.

BACKGROUND OF THE INVENTION

The present invention relates to a current conversion device for a single- or multi-axis arrangement having a voltage-source DC link, a plurality of inverters which are each connected to the voltage-source DC link on one side and can be connected to a motor in each case on the other side, and a control device with which each of the inverters can be short-circuited. Furthermore, the present invention relates to a method for operating such a current conversion device.

The following discussion of related art is provided to assist the reader in understanding the advantages of the invention, and is not to be construed as an admission that this related art is prior art to this invention.

Permanently excited synchronous motors (the present application is not restricted to such synchronous motors) are in most cases operated using frequency converters or inverters. Here many motors are designed such that they work in the field weakening range at high speeds. In this case the speed-dependent terminal reverse voltage of the motor is reduced by a suitable target current presetting, to the extent that the actual, uncompensated reverse voltage would lie above the maximum permissible DC link voltage of the connected DC link converter. If the frequency converter is powered down at an operating point such as this, the motor feeds power back into the DC link via the inverter diodes because of the high reverse voltage. If this generating power cannot be discharged from the DC link (e.g. active power infeed or brake chopper), the voltage of the DC link rises continuously. This can even result in destruction of the converter.

Until now there have been two strategies for limiting the DC link voltage in synchronous motors in the field weakening range.

"Voltage Protection" Module (VPM):

An additional module, called VPM, is connected to the three motor leads of the synchronous machine. Inside the module the three phases are rectified via a diode bridge and, if need be, are short-circuited via a thyristor. The thyristor is switched if the rectified voltage has reached a limiting value which cannot result in damage to the DC link. The VPM module must be able to safely manage the short-circuit current supplied by the synchronous machine. In a multiple drive group, in other words a group of converter modules, each with its own motor, each converter having a synchronous machine in the field weakening range must be assigned a VPM module. The disadvantage of the VPM is that an additional module must be employed.

Internal "Voltage Protection" (iVP):

With this method, the converter itself takes over the function of the VPM. A short-circuit of all three motor phases can likewise be achieved by selectively switching of all upper or lower power semiconductors. For the trigger mechanism it is necessary on the one hand to detect whether the parameters for an armature short-circuit are in place, i.e. the synchronous machine is located in the field weakening range and the recuperated energy cannot be taken up by the DC link. The armature short-circuit is, as with the VPM module, not triggered until a certain limiting value of the DC link voltage is reached.

It would therefore be desirable and advantageous to obviate prior art shortcomings and to provide an improved current conversion device for a single- or multi-axis arrangement, in which the inverter can be safely powered down.

SUMMARY OF THE INVENTION

According to one aspect of the present invention, a current conversion device for a single- or multi-axis arrangement has a voltage-source DC link, a plurality of inverters, each inverter having a DC input side connected to the voltage-source DC link and an AC output side connectable to an electric motor in one-to-one correspondence, and a control device operative connected to the plurality of inverters and configured to short-circuit each of the inverters, as well as a measurement device configured to measure an electrical variable at each of the inverters. The control device determines based on the measured electrical variables independently for each of the inverters directly or indirectly whether a particular inverter is feeding energy into the voltage-source DC link, and short-circuits, when this is the case, the particular inverter independently of the other inverters of the plurality of inverters.

According to another aspect of the invention, a method for operating a current conversion device for a single- or multi-axis arrangement, wherein the current conversion device includes a voltage-source DC link, a plurality of inverters which each have a DC input side connected to the voltage-source DC link and an AC output side connectable to an associated motor, includes measuring with a measurement device an electrical variable at each of the inverters, determining with a control device based on the measured electrical variables independently for each of the inverters directly or indirectly whether a particular inverter is feeding energy into the voltage-source DC link, and short-circuiting, when this is the case, the particular inverter independently of the other inverters of the plurality of inverters.

Thus advantageously each inverter of the current converter arrangement is checked separately to see whether or not it is supplying energy to the voltage-source DC link. In particular it supplies energy if the corresponding motor connected to it works in the field weakening range. If one of the inverters now supplies energy to the voltage-source DC link, it is short-circuited separately or independently of the other inverters. This means that at least one winding of the motor that is or is to be connected is/would be short-circuited. Independently of this, the other motors continue working in their present operating mode.

Preferably each of the inverters has AC terminals for connection to the respective motor, the measurement device is designed to perform voltage measurements at the AC terminals of each inverter, and the control device is designed to short-circuit the respective inverter if one of its phase-to-phase voltages exceeds a cut-off threshold. Thus on the AC voltage side it is established separately and indirectly via the voltage measurement for each inverter whether the inverter is supplying energy to the voltage-source DC link.

The cut-off threshold should correspond to at least the present DC link voltage in the voltage-source DC link. However, to define the cut-off threshold more precisely, the structure of the respective inverter(s) should be taken into account. In particular, inverter diodes that are switched in the conducting direction can be taken into account here. Accordingly it is advantageous if each inverter has a plurality of identical inverter diodes and the cut-off threshold corresponds to the sum of the present DC link voltage and twice the conducting-state voltage of each inverter diode.

Alternatively or additionally to the voltage measurements at the AC terminals of the inverter the measurement device can be designed, during and/or after a pulse inhibit (all switches of the inverter are powered down), to measure a DC link voltage of the voltage-source DC link and a current flow between each inverter and the voltage-source DC link, and by means of the control device it is possible to determine, on the basis of the DC link voltage and the respective current flow, the respective energy which is fed into the voltage-source DC link during and/or after the pulse inhibit. Thus it is possible, even on the DC current side individually for each inverter, to determine the energy that is fed into the voltage-source DC link. The precondition here is that it is determined on the basis of the measurement of the DC link voltage whether the cause of the pulse inhibit is an increased DC link voltage. This is the only way in which the status of the field weakening can be reliably determined indirectly via the DC link voltage.

The control device enables a supply of energy into the voltage-source DC link to be established indirectly on the basis of an envelope of the measured current flow. The envelope here represents the averaged amplitude of the current over time.

Preferably each of the inverters is a three-phase inverter. This means the inventive current conversion device can be used for standard three-phase motors.

In a preferred application, as has already been indicated, one motor each is connected to each inverter. Thus in so-called single- or multi-axis arrangements or single- or multi-axis drive groups the individual inverters of the individual motors can be short-circuited separately.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
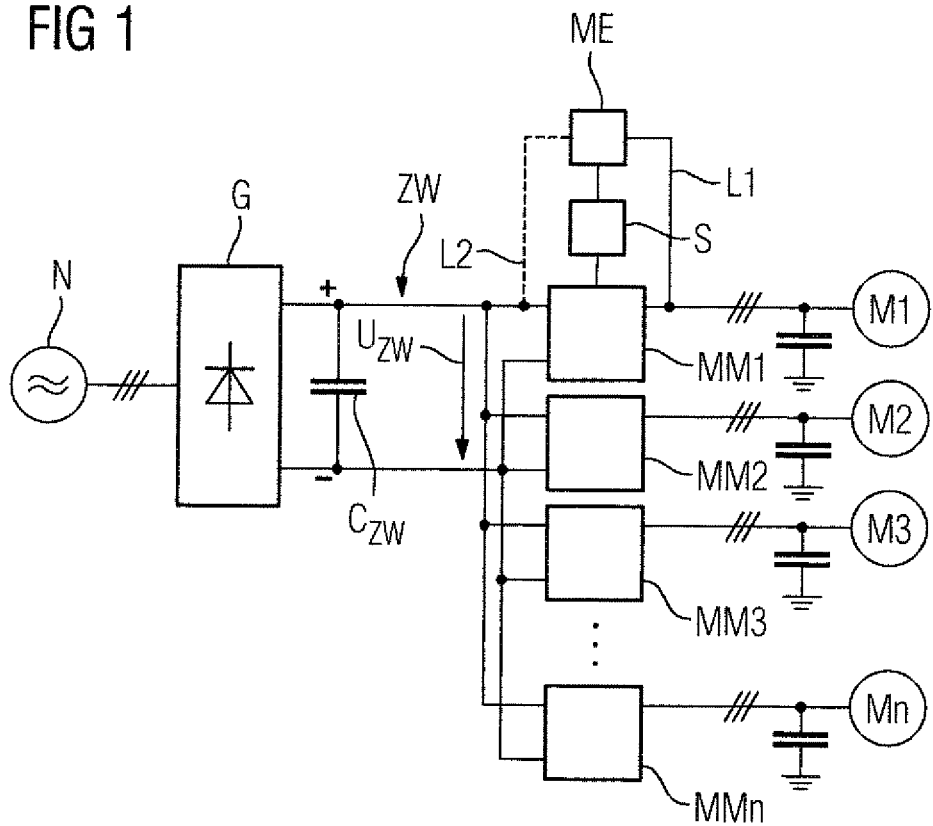
FIG. 1 shows a schematic circuit diagram of a multi-axis arrangement having numerous motors fed by a grid according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exemplary multi-axis drive group or multi-axis arrangement. In this case numerous motors M1, M2, M3, . . . , Mn are fed by a supply system N. The supply system N is here a three-phase system. Alternatively, one- or two-phase systems can be used. The motors are here also three-phase motors. Equally, one- or two-phase motors are also conceivable here. Each motor M1 to Mn is here symbolically connected to ground via a capacitor. The motors are preferably permanently magnetically excited synchronous motors. However, the inventive operating principle also applies for other motors.

The line voltages of the three-phase supply system N are initially rectified in a rectifier G to form a DC link voltage $U_{ZW}$. On the DC side a DC link capacitor $C_{ZW}$ is provided at the rectifier G for stabilization between the positive pole "+" and the negative pole "−". This essentially defines a voltage-source DC link ZW.

A plurality of motor modules MM1, MM2, MM3, . . . , MMn (also referred to here as current converters or inverters) are connected at the voltage-source DC link ZW in parallel. This means that a first DC terminal of each inverter is connected to the positive pole "+" of the DC link ZW and a second DC terminal of each inverter is connected to the negative pole "−" of the DC link.

On the AC side each inverter MM1 to MMn has, because of the three-phase motors, three AC terminals in each case, which are schematically illustrated as a common lead in FIG. 1.

Each inverter MM1 to MMn is controlled by a control device S. For the sake of clarity, a terminal in this regard in FIG. 1 is illustrated only by the control device S for the inverter MM1. The control device S controls the electrically operable switches of each of the inverters MM1 to MMn.

A measurement device ME captures an electrical variable at one or more of the AC terminals of each inverter MM1 to MMn. Again for the sake of clarity, only one measurement terminal for the first inverter MM1 is illustrated in FIG. 1. The measurement terminal may not simply be a single lead, but a plurality of leads, e.g. three leads in the case of a three-phase alternating current. Thanks to the measurement lead L1 one or more of the AC-side alternating voltages and/or one or more of the alternating currents of the three phases are measured.

Alternatively or additionally the measurement device ME has a second measurement lead L2, which on the DC side captures one or more electrical variables at each inverter MM1 to MMn. Again in FIG. 1 for the sake of clarity only one measurement lead L2 is symbolically illustrated, which runs from the measurement device ME to a DC terminal of the first inverter MM1. Using the second measurement lead L2 the DC link voltage $U_{ZW}$ can be measured and/or a current from the DC link to the respective inverter MM1 or vice versa.

The measurement device ME makes the respective measurement variables available to the control device S unprocessed or preprocessed. The control device S then controls the inverters MM1 to MMn as a function of the measurement variable(s) made available.

Figure 2:
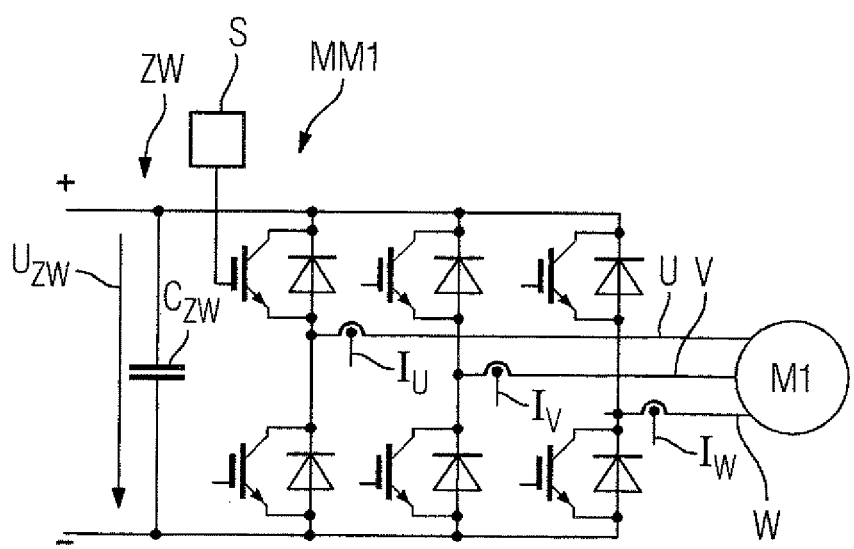
FIG. 2 shows a detailed basic circuit diagram of a motor module or inverter.

FIG. 2 illustrates a basic circuit diagram of an inverter, here the inverter MM1. The other inverters MM2 to MMn normally have the same structure. The inverter or the motor module MM1 is connected to the DC link ZW on the DC side, said DC link ZW being in turn symbolized here by the DC link capacitor $C_{ZW}$. The DC link voltage $U_{ZW}$ is defined between the positive pole "+" and the negative pole "−". On the AC side the inverter MM1 is connected to the three phases U, V and W of the motor M1. Normally the three-phase inverter MM1 here has three parallel series circuits between the positive pole "+" and the negative pole "−" of the DC link. Each series circuit consists of two or more (multilevel topology) dipoles connected in series, wherein each dipole consists of a switch (e.g. IGBT) and a diode parallel thereto. The node between the dipoles of each series circuit is in each case connected to one of the phases U, V, W of the motor M1. In the leads of the phases U, V and W the currents $I_U$, $I_V$ and $I_W$ can be measured.

Each switch of the inverter MM1 is controlled by the control device S. In FIG. 2 this is illustrated merely symbolically at the top left for the IGBT. The connection of the measurement device ME to the control device S or the inverter MM1 is not illustrated in FIG. 2.

If a plurality of inverters MM1 to MMn are now respectively driven using a synchronous machine or a motor in the multi-axis drive group or the multi-axis arrangement with connected voltage-source DC link as in FIG. 1, the problem with the iVP function (internal Voltage Protection) lies in establishing in which drive axes an armature short-circuit is or is not necessary.

If the armature short-circuit is triggered only as a function of the DC link voltage $U_{ZW}$, all motor modules or inverters with motor would execute the armature short circuit, regardless of whether this is necessary or not. If the armature short circuit is switched in the case of a synchronous machine which does not work in the field weakening range, the inverter (generally current converter) is on the one hand loaded with the additional current of the short circuit. On the other hand, the short-circuit current in the synchronous machine causes a brake torque, which can sometimes be disruptive. For this reason the information needed to detect a necessary armature short circuit should be obtained from the measurements of current or voltage of the motor phases. With the help of the so-called "Voltage Feedback Signals", i.e. the measured motor output voltages at the motor terminals, it is possible to determine whether a synchronous machine is feeding energy into the DC link ZW. This is the case if at least one line-to-line phase voltage is larger than the DC link voltage $U_{ZW}$. Specifically, the phase voltage should be limited to the sum of the DC link voltage $U_{ZW}$ and double the conducting-state voltage of the inverter diodes. The advantage of this is that an armature short-circuit is triggered only by those motor modules in which a line-to-line voltage corresponds to or exceeds the cut-off threshold. Motor modules which are preferably generally designed as current converters with energy transportation in both directions, with a lower line-to-line voltage would not be affected by the power-down. This means each current converter or motor module is short-circuited individually, independently of the others.

In an alternative embodiment, which can also be implemented in addition to the form of embodiment outlined above, the power-down would have to be provided, because of the current, after a pulse inhibit of a motor module MM1 to MMn in conjunction with a DC link voltage measurement. In a pulse inhibit all switches of a motor module are powered down. The pulse inhibit generally represents a fault response of the motor module or inverter. In this alternative power-down procedure ("power down" here means switching to the armature short circuit) a transient consideration of the current would have to be used during and shortly after the pulse inhibit. To this end it is expedient to consider the envelope of the current, i.e. the average amplitude of the current. If the current increases after a pulse inhibit, the machine is in the field weakening range and feeds energy into the DC link ZW. An armature short circuit would be necessary. If on the other hand the current decreases, the reverse voltage is not sufficient to feed energy into the DC link. In this case an armature short circuit would not be necessary.

In the above examples the motor modules MM1 to MMn have also been referred to as inverters. In general they should be referred to as current converters if they are operated in both directions, namely during generating and motoring operation of the machines M1 to Mn.

The advantage of the inventive current conversion device and of the operating method illustrated above is that in multi-axis drive groups of motor modules with connected synchronous machines an armature short circuit is executed only by those motor modules or current converters that feed energy back into the DC link and as a result would overload the DC link. All other axes are not affected by an armature short circuit and can continue to work normally.

The method described could be used as a digital circuit, e.g. as part of a predefined control, in an ASIC (Application Specific integrated Circuit) or FPGA (Field Programmable Gate Array) trigger circuitry which is necessary for controlling a current converter.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A current conversion device for a single- or multi-axis arrangement, the current conversion device comprising:
  a voltage-source DC link,
  a plurality of inverters, each inverter having a DC input side connected to the voltage-source DC link and an AC output side connectable to an electric motor in one-to-one correspondence, and
  a control device operative connected to the plurality of inverters and configured to short-circuit each of the inverters,
  a measurement device configured to measure an electrical variable at each of the inverters,
  wherein the control device determines based on the measured electrical variables independently for each of the inverters directly or indirectly whether a particular inverter is feeding energy into the voltage-source DC link, and short-circuits, when this is the case, the particular inverter independently of the other inverters of the plurality of inverters,
  wherein the measured electrical variable at each of the inverters is an AC voltage measured at the AC output side, and wherein the control device short-circuits the particular inverter when one of its phase-to-phase voltages exceeds a cut-off threshold, and
  wherein each inverter comprises a plurality of identical inverter diodes and the cut-off threshold corresponds to the sum of the actual DC link voltage and twice the forward voltage of each inverter diode.

2. The current conversion device of claim 1, wherein the cut-off threshold is greater than or equal to the actual DC link voltage in the voltage-source DC link.

3. The current conversion device of claim 1, wherein the measurement device is configured to measure, during or after a pulse inhibit, a DC link voltage and a current flow between each inverter and the voltage-source DC link, and the control device is configured to determine, based on the DC link voltage and the measured current flow, an amount of energy that is supplied to the voltage-source DC link during or after the pulse inhibit.

4. The current conversion device of claim 3, wherein the control device determined the supplied amount of energy indirectly based on an envelope of the measured current flow.

5. The current conversion device of claim 1, wherein each of the plurality of inverters is a three-phase inverter.

6. The current conversion device of claim 1, wherein an electric motor is connected to the AC output side of an associated inverter in one-to-one correspondence.

7. A method for operating a current conversion device for a single- or multi-axis arrangement, wherein the current conversion device comprises a voltage-source DC link, a plurality of inverters which each have a DC input side connected to the voltage-source DC link and an AC output side connectable to an associated motor, measuring with a measurement device an electrical variable at each of the inverters, determining with a control device based on the measured electrical variables independently for each of the inverters directly or indirectly whether a particular inverter is feeding energy into the voltage-source DC link, and short-circuiting, when this is the case, the particular inverter independently of the other inverters of the plurality of inverters, wherein the measured electrical variable at each of the inverters is an AC voltage measured at the AC output side, and wherein the control device short-circuits the particular inverter when one of its phase-to-phase voltages exceeds a cut-off threshold, and wherein each inverter comprises a plurality of identical inverter diodes and the cut-off threshold corresponds to the sum of the actual DC link voltage and twice the forward voltage of each inverter diode.

\* \* \* \* \*